UNITED STATES PATENT OFFICE.

RUDOLPH J. SCHIMPER, OF JERSEY CITY, NEW JERSEY, ASSIGNOR, BY MESNE ASSIGNMENTS, TO THE UNITED STATES FUEL COMPANY, OF NEW JERSEY.

ARTIFICIAL FUEL.

SPECIFICATION forming part of Letters Patent No. 447,138, dated February 24, 1891.

Application filed July 31, 1888. Renewed November 11, 1889. Serial No. 329,861. (No specimens.)

*To all whom it may concern:*

Be it known that I, RUDOLPH J. SCHIMPER, a citizen of the United States of America, and a resident of Jersey City, in the county of Hudson and State of New Jersey, have invented certain new and useful Improvements in Artificial Fuel, of which the following is a full, clear, and exact specification.

My invention relates to a new and useful combination of ingredients which, when properly prepared, mixed with suitable carbonaceous substances, and subsequently compressed, will produce an artificial fuel possessing great heat-giving properties without emitting smoke or noxious gases.

The object of my invention is to produce a clean, portable, and practically flameless and smokeless fuel, that will burn slowly in any vessel or stove or in the open air and at the same time yield an intense heat, the ingredients constituting the said fuel and the method of producing the same being hereinafter clearly described, and set forth in the claims.

To carry my invention into effect, I take the following ingredients, consisting of ninety-five per cent. of lime (calcined limestone) and five per cent. of gypsum, (or plaster,) and make a mixture of the same in ten gallons of water. I then dissolve in another vessel two pounds of acetate of lead in an additional five gallons of water. When these two are properly dissolved or mixed, I throw them both together into one vessel and continue to stir the same until they are thoroughly combined. I afterward mix this combined solution with any suitable carbonaceous substance until a thickened mass is produced. The functions of the acetate of lead are that it retards a too violent combustion, and thereby maintains a continuous and uniform heat.

In a suitably-constructed apparatus containing agitators or mixing-arms, (which by preference is cylindrically formed,) with a rotating shaft passing through it longitudinally, I place a sufficient quantity of finely-powdered vegetable charcoal, coke, coal, or other carbonaceous substance to absorb the before-mentioned fifteen-gallon mixture of slaked lime and gypsum, and the whole is then mixed together by rotary agitation in this cylindrical apparatus until a thickened mass is produced of about the consistency of stiff mortar. This being accomplished, I pass this agglomerated mass through compressing-rollers or any other suitable machine or apparatus that will press the pasty compound into blocks, cakes, or balls of any required shape or size, and either perforated or otherwise. These blocks or cakes are then dried, either in the open air or by exposure to heat in any kind of kiln or drying-chamber, and are then ready for use for either domestic, commercial, or manufacturing purposes.

The mixtures above referred to not only produce (when mixed with carbonaceous substance) a safe combustible fuel, but effect great cohesion and bind the whole block together without destroying the necessary porosity of a compact and perfect composition fuel.

Having thus described the nature of my invention and the method of producing the same, what I claim as new, and desire to secure by United States Letters Patent, is—

The composition of matter for heating purposes, consisting of powdered charcoal saturated with a solution of acetate of lead, with lime and gypsum compressed into blocks, in the following proportions, viz: one hundred pounds powdered charcoal, twenty-four ounces acetate of lead, ninety-five pounds of lime, and five pounds of gypsum, substantially as set forth.

In testimony that I claim the foregoing I have hereunto set my hand this 24th day of July, 1888.

RUDOLPH J. SCHIMPER.

Witnesses:
JAMES H. LANCASTER,
WM. P. HATHAWAY.